United States Patent
Meyers et al.

(10) Patent No.: US 7,667,644 B2
(45) Date of Patent: Feb. 23, 2010

(54) GPS RECEIVER RAIM WITH SLAVED PRECISION CLOCK

(75) Inventors: David W. Meyers, Morristown, NJ (US); Lawrence C. Vallot, Morristown, NJ (US); Brian Schipper, Morristown, NJ (US); Kelly Muldoon, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 283 days.

(21) Appl. No.: 11/869,614

(22) Filed: Oct. 9, 2007

(65) Prior Publication Data

US 2009/0091495 A1 Apr. 9, 2009

(51) Int. Cl.
*G01S 1/00* (2006.01)
(52) U.S. Cl. ............................. 342/357.12; 342/357.06
(58) Field of Classification Search ............ 342/357.06, 342/357.12
See application file for complete search history.

(56) References Cited

U.S. PATENT DOCUMENTS

| | | | | | |
|---|---|---|---|---|---|
| 5,923,286 | A | * | 7/1999 | Divakaruni | 342/357.06 |
| 5,931,889 | A | * | 8/1999 | Misra | 701/213 |
| 6,134,484 | A | * | 10/2000 | Geier et al. | 701/13 |
| 7,095,369 | B1 | * | 8/2006 | Clark | 342/357.02 |
| 7,190,307 | B2 | * | 3/2007 | Gronemeyer | 342/357.15 |
| 7,372,400 | B2 | * | 5/2008 | Cohen et al. | 342/357.01 |
| 7,558,157 | B1 | * | 7/2009 | Gardner et al. | 368/10 |
| 2005/0052317 | A1 | | 3/2005 | McBurney et al. | |
| 2006/0170589 | A1 | | 8/2006 | Park et al. | |
| 2006/0255281 | A1 | | 11/2006 | Lal et al. | |
| 2007/0160169 | A1 | | 7/2007 | Tanaka et al. | |
| 2007/0279279 | A1 | | 12/2007 | Meyers et al. | |

FOREIGN PATENT DOCUMENTS

WO 0201157 1/2002

OTHER PUBLICATIONS

Huang et al., "General Raim Algorithm Based on Aiding of Reciver Clock Bias", "Journal of Beijing University of Aeronautics and Astronautics ", Apr. 2001, pp. 161-163, Published in: Beijing, China.
Kozel et al., "Evaluation of GPS Precise Positioning Service Autonomous Integrity Monitoring Performance for Military Applications", "Position Location and Navigation Symposium", Apr. 1996, pp. 83-91, Publisher: IEEE.

* cited by examiner

*Primary Examiner*—Thomas H Tarcza
*Assistant Examiner*—Harry Liu
(74) *Attorney, Agent, or Firm*—Fogg & Powers LLC

(57) ABSTRACT

A method and a system for providing a substituted timing signal for a missing satellite ephemeris in execution of a RAIM algorithm includes deriving a plurality of position, velocity, and time solutions from a GPS navigation system. The position, velocity and time solutions are derived from a plurality of satellite ephemerides. An atomic clock provides an atomic clock signal. The atomic clock signal is compared to the derived time solutions to arrive at a correction factor. The atomic clock signal is adjusted according to the correction factor to develop an adjusted atomic clock signal. The adjusted atomic clock signal is substituted for a missing satellite ephemeris to execute the RAIM algorithm.

12 Claims, 2 Drawing Sheets

GPS RECEIVER RAIM WITH SLAVED PRECISION CLOCK

BACKGROUND OF THE INVENTION

RAIM is the abbreviation for Receiver Autonomous Integrity Monitoring, a technology developed to assess the integrity of Global Positioning System (GPS) signals in a GPS receiver system. It is of special importance in safety-critical GPS applications, such as in aviation or marine navigation.

RAIM detects faults by utilizing redundant GPS pseudorange measurements. That is, when more satellites are available than needed to produce a position fix, the extra pseudoranges should all be consistent with the computed position. A pseudorange that differs significantly from the expected value (i.e., an outlier) may indicate a fault of the associated satellite or another signal integrity problem (e.g., ionospheric dispersion). Traditional RAIM uses fault detection only (FD); however, newer GPS receivers incorporate Fault Detection and Exclusion (FDE) which enables them to continue to operate in the presence of a GPS failure.

Because RAIM operates autonomously, that is, without the assistance of external signals, it requires redundant pseudorange measurements. To obtain a 3-dimensional position solution, at least 4 measurements are required. To enable RAIM FD (Fault detection in RAIM), at least 5 measurements are required, and to enable RAIM FDE (Fault detection in RAIM with the ability to exclude faulty data), at least 6 measurements are required. However, more measurements are often needed depending on the satellite geometry. Typically, there are 7 to 12 satellites in view.

Conventional RAIM availability thus requires 6 or more satellite measurements with good satellite geometry. This is two or more satellites than is required for the basic navigation solution. However, if time can be eliminated from the list of unknowns, and thus drop the required number of satellites from 4 to 3, then RAIM FDE can be achieved with only 5 satellites. Time can be eliminated by proving the GPS receiver with a precise time reference such as that available from an atomic clock.

Since GPS requires "line of sight" reception to receive the GPS navigational signal, terrain surrounding runways can occlude one or more of the satellites at critical times. Removal of one or more of the several satellites compromises or prevents the availability of RAIM. Aircraft GPS precision approaches are frequently interrupted by RAIM outages. Certain flight operations, such as precision approach, can no longer be executed without RAIM availability.

There is an unmet need in the art for improving the availability of RAIM by using the aid a precise and accurate time signal.

SUMMARY OF THE INVENTION

A method and a system for providing a substituted timing signal for a missing satellite ephemeris in execution of a RAIM algorithm includes deriving a plurality of position, velocity, and time ("PVT") solutions from a GPS navigation system. The position, velocity and time solutions are derived from a plurality of satellite pseudorange measurements and ephemerides. An atomic clock provides an atomic clock signal. The atomic clock signal is compared to the derived time solutions to arrive at a correction factor. The atomic clock signal is adjusted according to the correction factor to develop an adjusted atomic clock signal. The adjusted atomic clock signal can then be substituted for a missing satellite measurement to execute the RAIM algorithm.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Receiver Autonomous Integrity Monitoring (RAIM) refers to a class of self-contained GPS integrity monitoring methods based on a consistency check among redundant ranging signals to detect an unacceptably large satellite range error due to either erroneous satellite clock or erroneous satellite ephemeris data.

RAIM involves two types of functions. The first function is to detect whether a malfunction that results in a large range error has occurred on any satellite, that is, to detect the presence or absence of such a malfunction. The second function is to identify the faulty ephemeris from a satellite from among the several ephemerides. Detection requires at least 5 satellites be visible. Identification requires at least 6 by conventional means.

Figure 1:
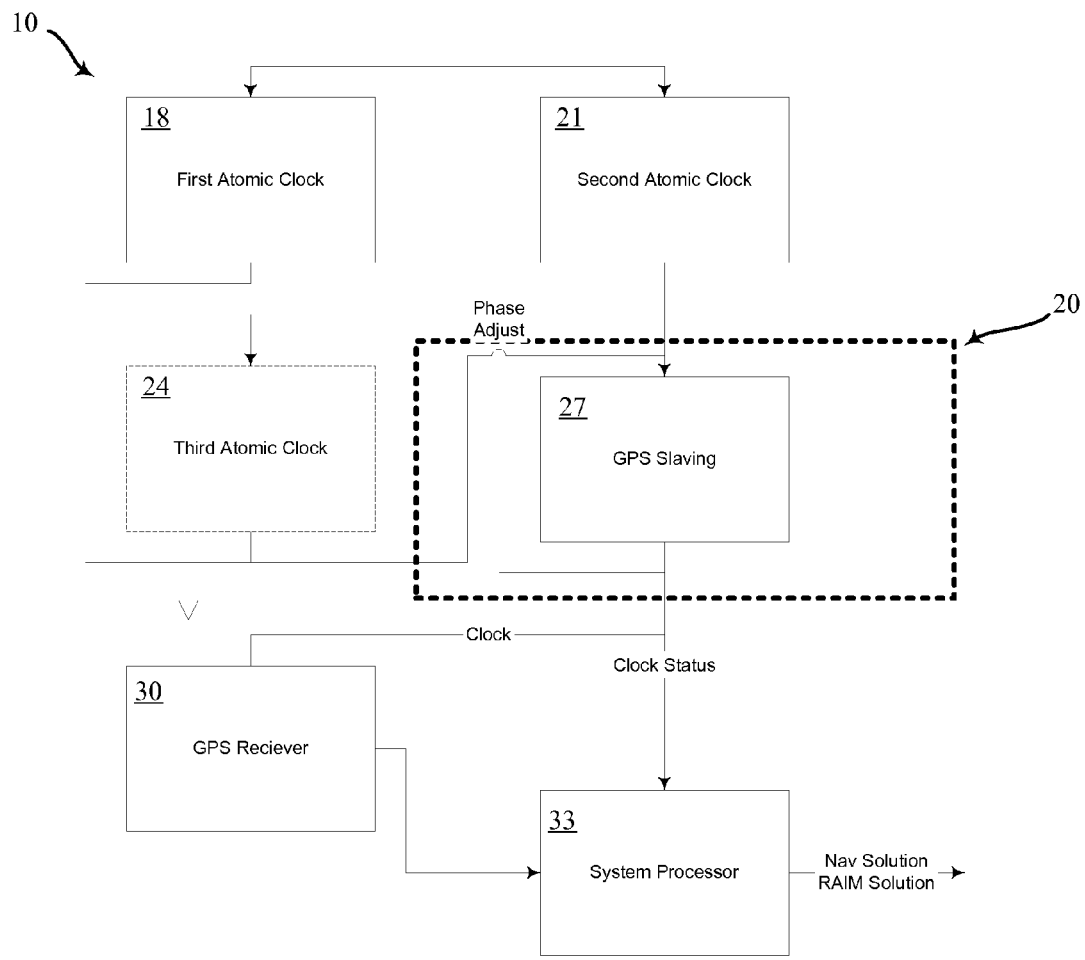
FIG. 1 is a block diagram of an exemplary GPS navigation system with an atomic clock and clock follower.

FIG. 1 illustrates a navigation system 10, which includes a first atomic clock 18, a second atomic clock 21, a GPS slaving unit 27, GPS receiver 30 and a system processor 33. In a non-limiting alternate embodiment, the navigation system includes a third atomic clock 24. A clock processor 20 includes the GPS slaving unit 27 and is used to slave the clocks 18, 21, 24 and to provide a frequency stable time standard to the remainder of the navigation system 10.

The GPS receiver 30 is configured to receive navigation signals from GPS satellites. The system processor 33 implements modified RAIM algorithms or functions enhanced by the output from the GPS slaving unit 27. In this embodiment, the input from GPS slaving unit 27 is used, not only to refine position, velocity, and time solutions, but also to detect faults in the individual output of the plurality of atomic clocks 18, 21, 24 as may become prominent over a short time interval.

As in some prior art systems, in the navigation system 10 illustrated in FIG. 1, the GPS satellite measurement provides a beginning time reference generally in a pulse per second (PPS) interval signal. A PPS signal is an electrical signal that very precisely indicates the start of a second. PPS signals are output by various types of precision clock, including some models of GPS receivers. Depending on the source, properly operating PPS signals have an accuracy ranging from a few nanoseconds to a few milliseconds.

PPS signals are used for precise timekeeping and time measurement. One increasingly common use is in navigation system timekeeping, including the NTP protocol, which is used to link the several subsystems in aircraft avionics. It should be noted that because the PPS signal does not specify the time but merely the start of a second, one must combine the PPS functionality with another time source that provides the full date and time in order to ascertain the time both accurately and precisely. Nonetheless, PPS signals can be extremely useful in slaving a plurality of clocks; in the case of this invention, the atomic clocks 18, 21, 24.

The basic physics of atomic clocks 18, 21, 24 have been fairly well understood for some time, along with the macro-engineering challenges in creating a clock 30 with frequency stability of one part in 10 billion—equivalent to gaining or losing just one second every 300 years. Exploiting microelectro-mechanical systems (MEMS) chip fabrication technology, the atomic clocks 18, 21, 24 have a volume of less than 0.1 cm$^3$ and consume only a few tenths of milliwatts of power, enabling the atomic clocks 18, 21, 24 to be used in solid state packages having a suitably small form factor.

A slave clock is a clock that is coordinated with a master clock, and the GPS slaving unit 27 is used to slave at least one of the plurality of atomic clocks 18, 21, 24 to the GPS receiver 30 to achieve what is known as "clock coasting". Clock coasting is a free-running operational timing mode in which continuous or periodic measurement of clock error, i.e., of timing error, is not made, in contrast to tracking mode. Operation in the coasting mode may be extended for a period of time by using clock-error data or clock-correction data (obtained during a prior period of operation in the tracking mode occurring at the clock processor 20) to estimate clock corrections for the no-satellite situation.

Slave clock coordination is usually achieved by phase-locking the slave clock signal to a signal received from the master clock, in this non-limiting example, a PPS signal. The GPS slaving unit 27 is used for the phase-locking by noting the phase relative to the master clock. To adjust for the transit time of the signal from the master clock to the slave clock, the phase of the slave clock may be adjusted with respect to the signal from the master clock so that both clocks are in phase. Thus, the time markers of both clocks, at the output of the clocks, occur simultaneously.

Atomic clocks generally produce great short term precision but may suffer over long periods with stability deficiencies. GPS clocks, on the other hand, have short term stability deficiencies but are stable over longer periods. The distinct and complementary natures of time derived by the atomic clock 30 and the time solution derived from data received at the GPS receiver 12 assure greater accuracy of solutions of the RAIM algorithms at the processor 27.

The GPS receiver 30 has a clock bias from GPS time as received. If a highly stable clock reference is used, however, the GPS receiver 30 time could be based on the highly stable clock without solving for a bias. "Clock coasting" requires an atomic clock with superior long term stability, thereby combining the strengths of each time discerning system to get a far more accurate and precise determination of system time.

The clock processor 20 facilitates coasting by accumulating errors for calculating RAIM availability within a measurement period. The subsequent estimation for the next calculations predict and constrain time values based on higher precision atomic clocks 18, 21, 24. RAIM can be synthesized to provide ephemeris for a missing satellite. Synthesis is based upon an assumption that the user clock error "dynamics" are milder than the vehicle dynamics, thus a clock processor 20 may be allowed to quit tracking the clock error for a short period and determine integrity with only four satellites. The length of time for which this may reasonably be done depends, of course, on the user clock frequency stability.

The on board precise frequency standard is slave-locked to the GPS receiver 30 exploiting a one PPS signal based on UTC. Within the clock processor 20, the on board time received time stamps and the on board precision atomic clock form a closed loop system that has the historical inaccuracies of the precision clock contained within the loop parameters, allowing the instability of the clock to be effectively zeroed prior to a RAIM outage. As a result, the clock processor 20 derives a signal through clock coasting that during periods of RAIM outage is well determined and predictable due to the closed-loop hardware. Where, as in one non-limiting embodiment one atomic clock 18 is used, the operation of the clock 18 is compared to the time signal derived at the GPS receiver 30 to determine the operable status of the clock 18.

In another non-limiting option, at least two calibrated and slaved atomic clocks 18 and 21 are exploited. The time outputs from the clocks 18 and 21 can be compared during periods of coasting. Any inconsistency between two clocks triggers a failure detection capability; thereby, to assure integrity of the clock signal, if one of the clocks fails (and the failure is not a "common mode" failure, i.e. a failure that kills off the accuracy of both clocks in the same way) a fault is indicated such that the navigation solution is not trustworthy.

In an embodiment exploiting three or more clocks 18, 21, 24, an exclusion exploits the output of two of the clocks that generally agree; for example, the second and third atomic clocks 21 and 24. The remaining clock 18 is determined an outlier and the output of the first atomic clock 18 is disregarded in developing a clock solution at the clock processor 20. In the embodiment, an enunciator (not shown) might, optionally, be used to signal the need for examining the trio of clocks 18, 21, 24 to determine and correct the source of the fault.

Continued RAIM availability is facilitated by the availability of a precise frequency standard within the navigational system 10. When the time solution derived from the GPS receiver 30 is in error, the system processor 33 can isolate the offending satellite. As a result, the system processor 33 will set an internal satellite health indicator to "unhealthy" which causes the GPS receiver 30 to remove the satellite from the tracked list. Furthermore, upon isolation, the system processor 33 recalculates the receiver time and controls without the offending satellite. The system processor 33 will continue to monitor the removed satellite and compare its derived time signal to the onboard signal to determine when to set the internal satellite health indicator to healthy again and include it in the tracked list.

In both embodiments, the time stamping is optionally based on Coordinated Universal Time ("UTC") although any internally consistent time stamping convention will suitably serve the ends of the invention. Ongoing time stamping of GPS and IMU data allows the clock processor 20 to implement a closed loop system that measures the historical inaccuracies of the atomic clocks 18, 21, 24. In operation, the clock processor 20 compares the atomic clocks' 18, 21, 24 time with the time solution from such GPS signals as are received at the GPS receiver 30. With designated loop parameters, any instability of the atomic clocks 18, 21, 24 is effectively zeroed prior to the RAIM outage. The resulting clock coasting during the RAIM outage is well-determined and predictable due to the closed-loop hardware.

A closed-loop multiple clock 30 system to reduce clock 30 errors in frequency, drift and second order rate of change for RAIM calculation in the absence of over determination (less than five satellites) of PVT and clock 30 errors and drift.

Figure 2:
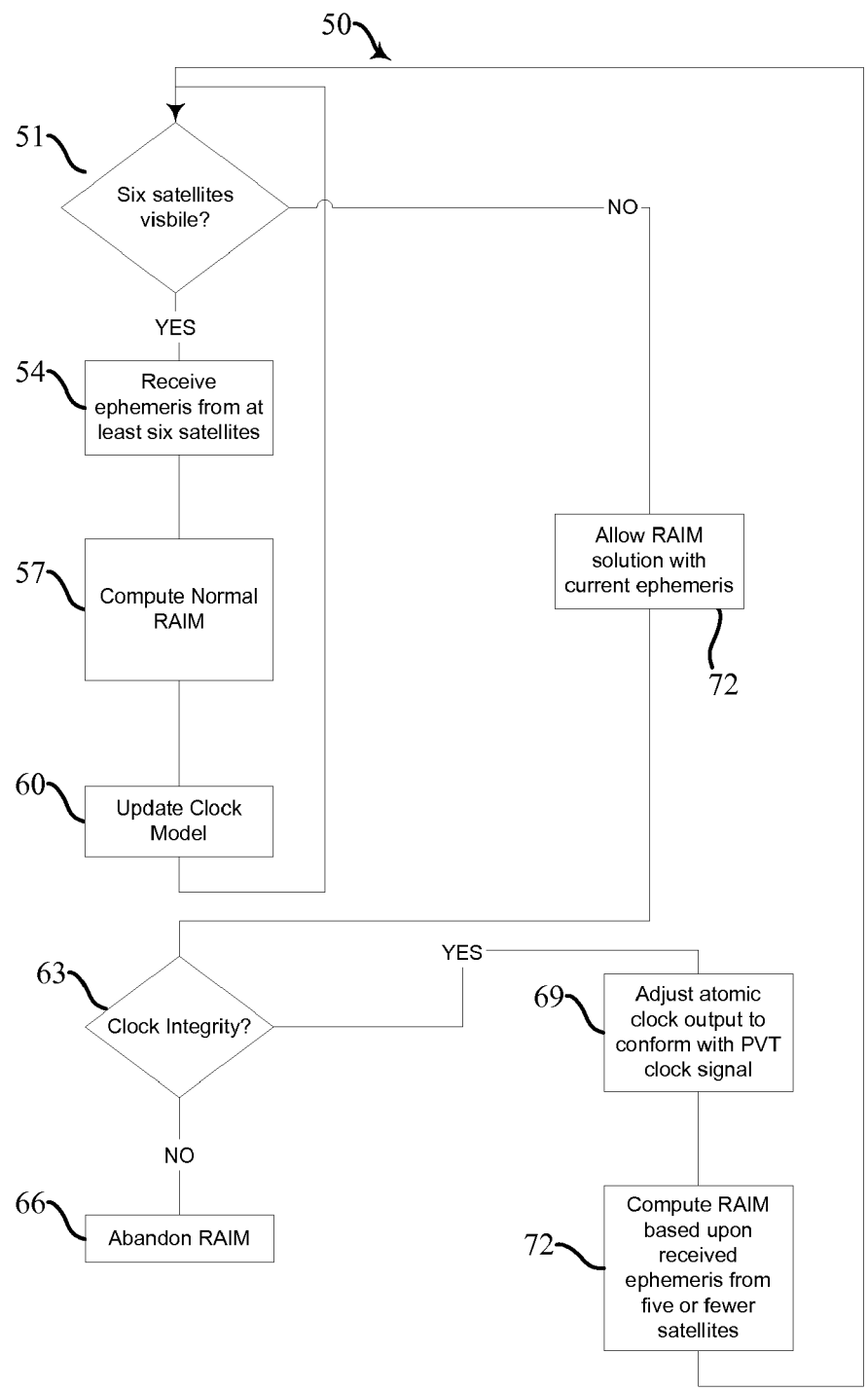
FIG. 2 is a system of executing a RAIM algorithm based upon clock coasting with an atomic clock.

Referring to FIG. 2, a method 50 for executing a RAIM is illustrated The RAIM algorithm is based upon an atomic clock signal received from at least one atomic clock. In some embodiments, a plurality of clocks is disciplined with a process of clock coasting.

At a block 51, GPS ephemerides are received and identified as emanating from distinct satellites. The number of distinct satellite ephemerides are identified. Conventional RAIM algorithms rely upon ephemerides from six or more satellites. To obtain a 3-dimensional position solution, at least 4 measurements are required. To detect a fault, at least 5 measurements are required, and to isolate and exclude a fault, at least 6 measurements are required; however, more measurements are often needed depending on the satellite geometry. Typically, there are 7 to 12 satellites in view.

If, at the block 51, six or more satellites were visible, then at a block 54, ephemerides from the visible satellites are received to calculate RAIM based upon conventional methods. With the RAIM solution, appropriate ephemerides are identified to derive a time solution. With that time solution, at a block 60, the availability of GPS time allows the slaving of one or more atomic clocks to a derived portion of a PVT solution derived at a GPS receiver.

If, at the block 51, fewer than six satellites had been available, at a block 72, the method 50 progresses to execute the RAIM algorithm using the adjusted or conditioned atomic clock output as a substitute for the missing sixth satellite ephemeris. Upon the execution of the RAIM algorithm using the conditioned atomic clock output, the system responds by known means. By virtue of the closed-loop multiple clock system to reduce clock errors in frequency, drift and second order rate of change for RAIM calculation in the absence of over determination (less than five satellites) of PVT and clock errors and drift, the RAIM solution will be accurate with one less satellite.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for providing a substituted timing signal for a missing satellite ephemeris in execution of a RAIM algorithm, the method comprising:
    deriving a plurality of position, velocity, and time solutions from a GPS navigation system derived from a plurality of satellite ephemerides;
    receiving an atomic clock signal;
    comparing the atomic clock signal to the derived time solutions to derive a correction factor;
    adjusting the atomic clock signal according to the correction factor to develop an adjusted atomic clock signal; and
    substituting the adjusted atomic clock signal for a missing satellite ephemeris to execute the RAIM algorithm.

2. The method of claim 1, wherein the GPS navigation system is an inertial GPS system.

3. The method of claim 1, wherein the atomic clock is a chip scale atomic clock.

4. The method of claim 1, wherein at least one of the plurality of satellite ephemerides is a PPS ephemeris.

5. A GPS navigation system including a RAIM processor, the GPS navigation system comprising:
    a GPS receiver for receiving satellite ephemerides from a plurality of GPS satellites, the receiver configured to derive a plurality of position, velocity, and time solutions;
    an atomic clock producing a clock signal;
    a clock follower to compare time solutions from the GPS receiver to the clock signals and deriving a correction factor to synthesize a corrected clock signal; and
    a RAIM algorithm processor to receive the satellite ephemerides and the time solutions from the GPS receiver and the corrected clock signal to test the integrity of each of the satellite ephemeris in the satellite ephemerides.

6. The system of claim 5, wherein the GPS receiver includes an inertial measurement unit.

7. The system of claim 5, wherein the ephemerides include at least one military GPS satellite ephemeris.

8. The system of claim 5, wherein the atomic clock is a chip scale atomic clock.

9. An apparatus for providing a substituted timing signal for a missing satellite ephemeris in execution of a RAIM algorithm, the method comprising:
    a GPS receiver for deriving a plurality of position, velocity, and time solutions from a GPS navigation system derived from a plurality of satellite ephemerides;
    an atomic clock for generating an atomic clock signal;
    a clock follower for:
        receiving an atomic clock signal;
        comparing the atomic clock signal to the derived time solutions to derive a correction factor;
        adjusting the atomic clock signal according to the correction factor to develop an adjusted atomic clock signal; and
    processor for executing the RAIM algorithm based upon the adjusted atomic clock signal substituted for a missing satellite ephemeris.

10. The system of claim 9, wherein the GPS navigation system is an inertial GPS system.

11. The system of claim 9, wherein the atomic clock is a chip scale atomic clock.

12. The system of claim 9, wherein at least one of the plurality of satellite ephemerides is a PPS ephemeris.

* * * * *